Nov. 21, 1933.　　　T. F. KOENIG　　　1,935,880
DOORLOCK FOR AUTOMOBILES
Filed July 29, 1932　　3 Sheets-Sheet 1
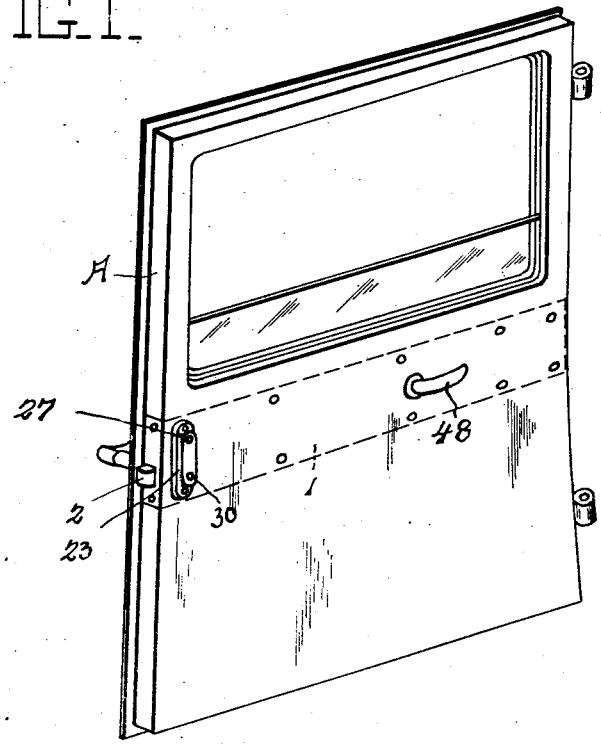
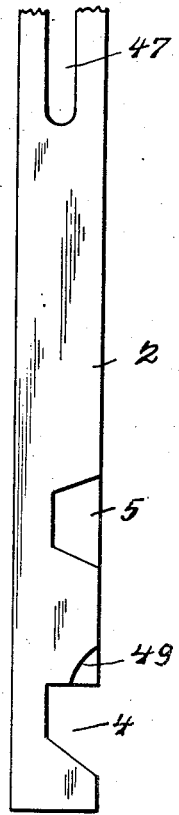
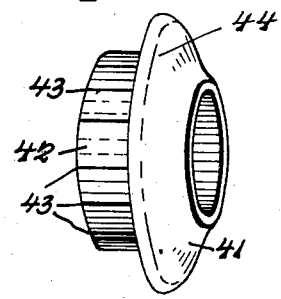
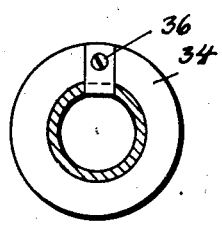
Inventor
THEODORE F. KOENIG.
By Robert Roch
Attorneys Nov. 21, 1933.　　　T. F. KOENIG　　　1,935,880
DOORLOCK FOR AUTOMOBILES
Filed July 29, 1932　　　3 Sheets-Sheet 2
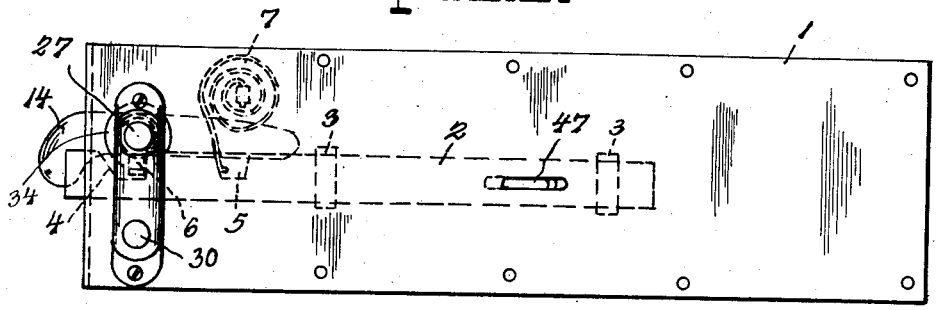
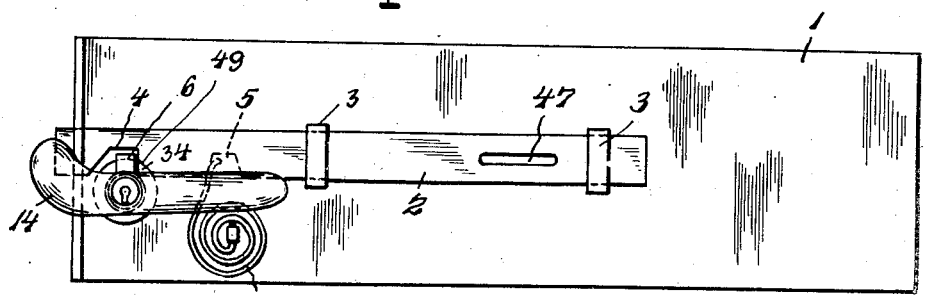
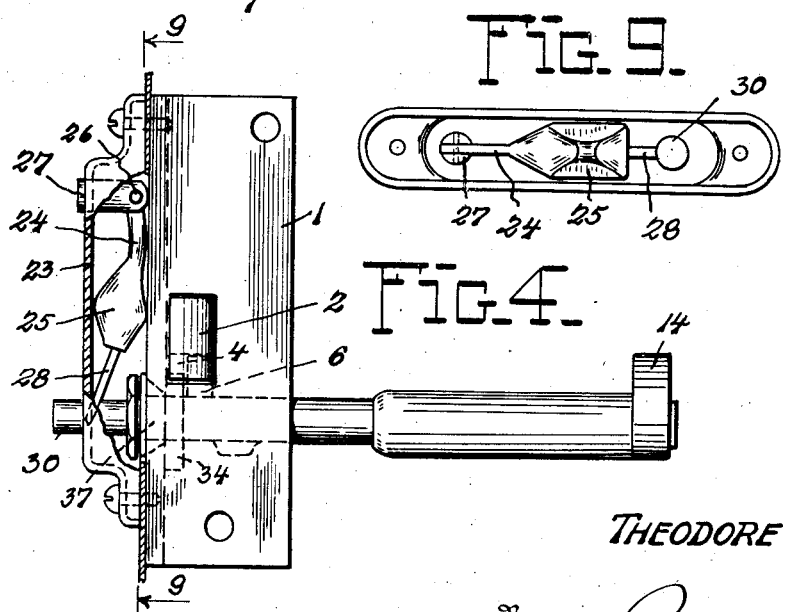
Inventor
THEODORE F. KOENIG.
By
Attorneys Nov. 21, 1933.  T. F. KOENIG  1,935,880
DOORLOCK FOR AUTOMOBILES
Filed July 29, 1932  3 Sheets-Sheet 3
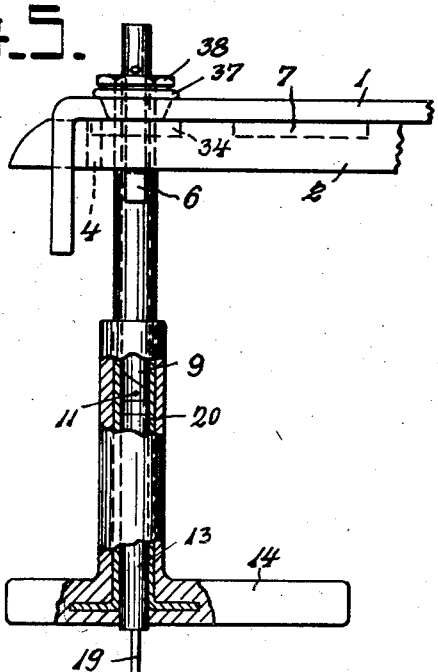
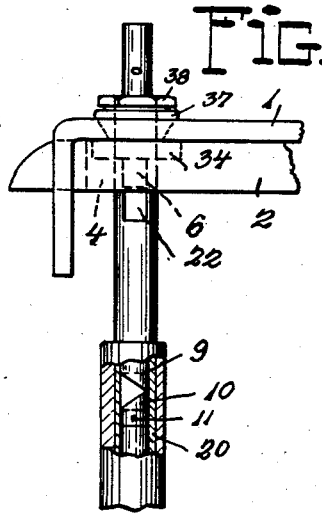
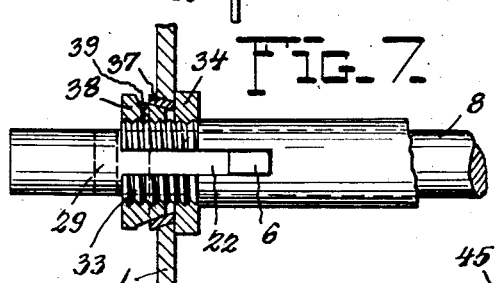
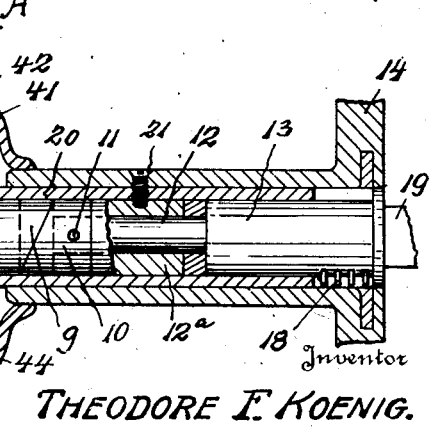
THEODORE F. KOENIG.

Patented Nov. 21, 1933

1,935,880

UNITED STATES PATENT OFFICE 1,935,880

DOORLOCK FOR AUTOMOBILES

Theodore F. Koenig, Cleveland, Ohio

Application July 29, 1932. Serial No. 625,749

7 Claims. (Cl. 70—91)

In locking mechanism usually employed for locking the doors of automobiles there is more or less likelihood of the mechanism yielding to the efforts of an individual seeking unauthorized access to the vehicle, or if the locking mechanism does not yield to such efforts, the handle of the door is frequently broken off. This is due to the fact that the handle of the door is always in positive interconnection with the conventional lock-bar or latch, and it often happens that the locking mechanism for the handle and latch refuses to yield under the application of force to the handle of the door by a seeker of unauthorized access to the vehicle, which results in the handle being twisted from the door, all access to the interior of the car being thereby prevented and causing a substantial amount of inconvenience, loss of time, and expense in making the necessary repairs. This will be clearly apparent when it is recalled that the twisting movement to which the door handle is subjected by a lever applied thereto and turned, is considerable, so that there often results the twisting of the handle completely from the door in the event that the lock mechanism fails to yield.

In the present invention, this likelihood of the handle being twisted off the door by application of excessive force thereto when the door is locked, is avoided by the provision of mechanism in the handle whereby the usual rigid interconnection between the handle and lock bar is interrupted upon locking the door, and the handle is rendered freely rotatable upon the application of a turning force, without damage in any way to the locking mechanism of the door, so that no purchase upon the handle can be obtained which would be resisted by the locking instrumentalities. In other words, when the door is locked, the handle is automatically released from rigid connection with the lock bar and any attempt to force the locking mechanism and lock bar by twisting the handle simply results in the handle freely turning under the application of the force, without any of the turning movement being transmitted to the locking mechanism or lock bar.

The present invention therefore provides an improved locking mechanism for the doors of an automobile or similar vehicle, wherein there is provided a construction which materially reduces the likelihood of yielding to the efforts of an individual seeking unauthorized access to the car, and wherein the likelihood of the handle becoming broken is very materially reduced.

It will be understood, therefore, that the invention in general provides an improved lock construction wherein the handle is removed from engagement with the locking bar when the door is locked, and rendered freely rotatable under application of force substantially less than that required to break the handle; and the invention also embraces means for ready engagement and disengagement of the lock bar actuating instrumentalities with the lock bar, the construction being marked by its high degree of simplicity.

The details of the invention will be more readily understood by reference to the accompanying drawings in which—

Figure 1 represents a perspective view of a vehicular door embracing the features of this invention.

Figure 2 is a view of the rear of the locking mechanism of the present construction.

Figure 3 is a view of the front of the mechanism illustrated in Figure 2.

Figure 4 is a view looking from the left-hand end of Figure 3, and illustrating additional details of the mechanism of this invention.

Figure 5 represents the lock bar actuating mechanism when in locked position.

Figure 6 is a view similar to Figure 5, but showing the parts in unlocked relation.

Figure 7 is a fragmentary view partly in section of the upper end portion of the mechanism shown in Figures 5 and 6.

Figure 8 is a longitudinal sectional view through the entire handle mechanism, showing the means of mounting the handle in the door of the vehicle.

Figure 9 is a view taken on the line 9—9 of Figure 4.

Figure 10 is a perspective view of the left hand end of the mechanism shown in Figure 8.

Figure 11 is a sectional view along the line 11—11 of Figure 10.

Figure 12 is an elevational view of a portion of the lock bar.

Figure 13 is an end view of a retaining member, the view being taken substantially on the line 13—13 of Figure 8.

Figure 14 is a perspective view of the key member illustrated in Figure 13.

Figure 15 is a perspective view of a retaining member shown in section in Figure 8 and employed to prevent rattling of the handle mechanism in the door of the vehicle.

Referring more particularly to the drawings, the mechanism is applied to a vehicular door A illustrated as a conventional automobile door. The locking mechanism of this invention includes the metal plate 1 on which the locking bar 2 is slidably mounted in the guides 3. This locking bar is recessed as shown at 4 and 5 for the reception of the actuating lug 6 and the end of the spring 7, which latter member maintains the lock bar normally in locking position.

This lug 6 is mounted on a cylindrical, slidably mounted bolt member 8, which is provided with a cam 9, which is adapted to engage a similarly shaped cam 10 mounted by means of pin 11 on the end of the cylindrical extension 12 of the lock cylinder 13 mounted within the handle 14.

The bolt 8 is provided with a series of indentations 15, having an arcuate contour, into which fits the detent 16 acted upon by a spring 17 to maintain the detent 16 in engagement with the recesses 15, the detent and spring being housed in a sleeve 20. This detent is adapted to secure the bolt 8 in position either with the lug 6 in engagement with the lock bar 2, or with the lug 6 out of engagement with the lock bar.

It will be understood that the cam 10, extension 12, and cylinder 13 are mounted for free rotation in the sleeve 20 upon actuation of the key 19 inserted in the lock opening of the handle 14. The lock mechanism may be of a standard construction and is contained in the cylinder 13 from which extend the locking tumblers 18 which normally hold the parts 10, 12 and 13 against rotation until retracted by the turning of key 19. The turning of the key 19 also produces the turning of the parts 10, 12 and 13 so that the cam 10 will act upon the cam 9 to separate the cam surfaces as indicated in Figure 6, thereby pushing the bolt 8 until lug 6 is brought into engagement with the locking bar 2. It will be understood of course that previous to turning the key, the cams 9 and 10 are in engagement, as will be seen in Figure 5, and the positioning of the cams in this relationship will be more clearly explained hereinafter.

It will be seen that the parts 10, 12 and 13 are retained in proper position relatively to the sleeve 20 by the provision of a retaining sleeve 12a, which sleeve 12a, sleeve 20 and handle 14 are secured together by screw 21.

It will be apparent from the drawings that the sleeve 20 is of sufficient length to enclose cam 9 and bolt 8, as well as the parts 10, 12 and 13, and it is the sleeve 20 which provides the mounting relative to which the bolt 8 is slidable. To enable the bolt 8 to slide as required, the sleeve 20 is provided with a slot 22 through which the lug 6 extends, the slot 22 being of a length sufficient to accommodate the movement of the lug 6 as the latter is brought into and out of engagement with the locking bar 2.

Since the lug 6 is the member which directly actuates the locking bar 2 to retract this bar from latching position for opening the door, it will be apparent that when projection 6 is out of engagement with the locking bar 2, as in Figure 5, the door of the car will be locked, and attempts at thievery by forcing the handle will be unsuccessful as the disengaged position of projection 6 allows the entire handle structure to freely turn upon application of force thereto.

It will be seen from Figure 5, that when the projection 6 is disengaged from locking bar 2, and the door accordingly locked, the cams 9 and 10 will be completely engaged. This condition is effected in the following manner, by actuation of the mechanism of Figure 4.

This mechanism is enclosed in the housing 23, which is mounted on the interior surface of the vehicle door. The mechanism includes a lever 24 which has an enlarged offset portion 25, the surface of which is in engagement with the plate 1, forming a fulcrum for lever 24. For actuating the lever, there is provided the push-button 27 pivotally connected at 26 to the end of the lever arm 24, this button 27 projecting through a suitable opening provided in the housing 23. The lever 24 has also an extension 28 which fits into an opening 29 in the cylindrical button 30 mounted on the end of the bolt 8. This button 30 also extends through a suitable opening in the housing 23, and when pressure is exerted upon it, as by the pressure of the thumb of an occupant of the vehicle, the bolt 8 is pushed outwardly relatively to the sleeve 20, and the lug 6 on bolt 8 is correspondingly shifted to locked position out of engagement with the lock bar 2 by virtue of the slot 22, the bolt 8 thereby being shifted until cam 9 engages with cam 10. The bolt 8 is held in this position against accidental displacement by the engagement of the detent 16 with a corresponding recess 15 in the bolt 8. For unlocking from the inside of the car the bolt 8 may be shifted by pressure on push button 27, thereby retracting bolt 8 so that the lug 6 is in engagement with the lock bar 2. This rocks the lever 24, so that the button 30 is pulled back to the extended position shown in Figure 4. Of course when the button 30 is pushed in to shift the bolt 8 to locking positon with lug 6 disengaged from locking bar 2, the lever 24 is rocked on the fulcrum 25 to extend button 27 a corresponding distance from the housing 23. Therefore, by manipulation of the buttons 27 and 30 the lug 6 may be engaged with or disengaged from the lock bar 2 without necessitating the use of the key 20.

Since the button 30 does not rotate, while the bolt 8 is rotatably mounted for turning with the handle, as the handle 14 is turned, a special connection must be provided between the bolt 8 and the extension 30. This connection is shown in Figure 11, and as illustrated comprises a screw 31, the head of which is countersunk in the socket 31a in the button 30 and secured therein by a cotter pin 32 shaped to retain the screw 31 in position while allowing free turning of the screw. The bolt 8 is threadedly maintained upon the shank of the screw, it being understood that the screw freely turns in its socket with the turning of the bolt 8.

The sleeve 20 is threaded as shown at 33 where it is inserted through the plate 1, and over this threaded portion is placed a nut 34, which, when the mechanism is assembled, abuts against the side of the plate 1 and serves as a stop member to prevent the sleeve 20 and bolt 8 from being passed too far through the plate 1, the sleeve 20 and lug 6 abutting against the nut 34 when the structure is assembled. Since the sleeve 20 rotates in operation as the handle 14 is turned to open the door, means must be provided to prevent the nut 34 from becoming bound or the sleeve 20 from unscrewing so as to be displaced from its position relatively to the plate 1. For this purpose there is provided a key 35 which is secured by a screw 36 to the nut 34, and which is formed in a substantially right angled configuration, one side being positioned in the slot 22 of the sleeve 20. Therefore, when the sleeve 20 is rotated, the nut 34 turns with it but is maintained in the same position relatively to the sleeve 20 through the locking action of key 35 engaging the slot 22.

To maintain the assembly in correct position relatively to the plate 1, and to provide a bearing surface for the rotation of the assembly, there is provided a conical washer 37 which fits the size of the opening in the plate 1 through which the assembly is passed. Fitting into the enlarged side of the conical washer 37 is a nut 38 which is threaded on the threads 33 to the sleeve 20. This nut 38 is secured in position by the screw 39 and rotates together with the washer 37 and nut 34 as the sleeve 20 is rotated.

To prevent the assembly from rattling in the door of the vehicle, and to properly mount the assembly relatively to the door, there is provided a leather washer 40 which surrounds the sleeve 20 in the opening in the door A provided for the insertion of the assembly, and retaining the handle in position and closely fitting between the washer 40 and the door, is the retaining member 41. This member is illustrated in detail in Figure 15, and is shown as comprising the collar 42 provided with slits 43, and the flange portion 44. This collar is inserted between the washer 40 and the door until the flange 44 abuts against the door, it being understood that the handle 14 snugly fits into the flange 44. To secure this retaining member in position, the collar 42 has the portions between the slits bent in opposite directions as indicated at 45 and 46, thus securing the member firmly in position; and since the collar 42 snugly fits between the door and the washer 40, and since the handle 14 snugly fits into this retaining member 41, it will be seen that the assembly is securely held against rattling.

It will be further observed that the locking bar 2 is provided with a slot 47, by means of which the lock bar may be operated through the instrumentality of the handle 48 in a well understood manner.

In operation, it will be seen that when the door is locked, which is accomplished by pressing button 30, the lug 6 is out of engagement with the recess 4 in the lock bar 2 and the cam surfaces 9 and 10 are in engagement with each other. The spring 7 presses the lock bar 2 towards locking position. Upon rotation of the handle 14, the sleeve 20 is rotated and the cylinder 13, together with the bolt 8, are rotated along with the handle and sleeve, and since the lug 6 is out of engagement with the lock bar 2, when the door is locked, any attempt to open the door by manipulation of the handle will simply cause a free rotation of the handle 14, sleeve 20, cylinder 13, and bolt 8. When the door is to be unlocked, the key 19 is inserted in the cylinder 13, as shown, in Fig. 8, and turned. This turning retracts tumblers 18, and simultaneously turns cylinder 13, extension 12, and cam 10, thus pushing bolt 8 inwardly until lug 6 engages lock bar 2, as shown in Figure 6. When in the position shown in Figure 6 when the handle 14 is turned, the lug 6 being in engagement with the recess 4 in the lock bar 2, the lock bar will be retracted against the pressure of the spring 7 and permit the door to be opened. Similar action is obtained by proper manipulation of the lever 24 as aforesaid.

To prevent accidental displacement of the handle, the lock bar 2 is provided with an arcuate cut-out portion 49 which is adapted to frictionally engage the nut 34, the surface of the cut-out portion being held against the washer by the pressure of the spring 7. Therefore, in order to move the handle, sufficient force must be applied thereto to overcome the friction between the contacting surfaces of the arcuate cut-out portion 49 and the nut 34, which friction is created by the pressure of the spring 7.

Having thus described my invention, what I claim as new and desire to secure by Letters Patent of the United States, is—

1. A lock mechanism for vehicular doors and the like, comprising, in combination, a lock bar and instrumentalities for operating the lock bar, the instrumentalities including a handle member, a sleeve within the handle member and secured thereto, a bolt within the sleeve and comprising a pair of sections, one of which sections is slidable relatively to the sleeve but held against rotation with respect to said sleeve, the other of which sections is disposed longitudinally in said sleeve but turnable relatively thereto, a lug carried by said slidable section and engageable and disengageable with the said lock bar incident to shifting of said slidable section, each of said sections including cooperating cam surfaces for slidably shifting the lug carrying section in one direction by turning movement of the other section whereby to bring said lug into engagement with the lock bar for operation of the lock bar by the handle and allowing the lug carrying section to be shifted in the opposite direction to disengage the lug from the lock bar, means for yieldably retaining said slidable section in each of the respective lock bar engaging and disengaging positions of the lug, means for turning the turnable section to shift said slidable section into operative position relatively to the lock bar for operation of the lock bar by the handle, and independent means for shifting the said slidable section to an inoperative position relatively to the lock bar.

2. A lock mechanism for vehicular doors and the like, comprising, in combination, a lock bar and instrumentalities for operating the lock bar, the instrumentalities including a handle member, a sleeve within the handle member and secured thereto, said sleeve having a slot therein, a bolt within the sleeve and comprising a pair of sections, one of which sections is slidable relatively to the sleeve but held against rotation with respect to said sleeve, the other of which sections is disposed longitudinally in said sleeve but turnable relatively thereto, a lug carried by said slidable section and engageable and disengageable with said lock bar incident to shifting of said slidable section, said lug extending through the slot in said sleeve to project beyond the sleeve and interlocking the sleeve and slidable section for simultaneous rotation by said handle, each of said bolt sections including cooperating cam surfaces for slidably shifting the lug carrying section in one direction by turning movement of the other section whereby to bring said lug into engagement with the lock bar for operation of the lock bar by the handle and allowing the lug carrying section to be shifted in the opposite direction to disengage the lug from the lock bar, a yieldable detent between the slidable section and sleeve for yieldably retaining said slidable section in each of the respective lock bar engaging and disengaging positions of the lug, means for turning the turnable section to shift said slidable section into operative position relatively to the lock bar for operation of the lock bar by the handle, and independent means for shifting the said slidable section to an inoperative position relatively to the lock bar.

3. A lock mechanism for vehicular doors and the like, comprising, in combination, a lock bar adapted to be mounted on the door in slidable relation therewith for movement into locking and unlocking positions, a handle member for actuating the lock bar, instrumentalities for rendering the lock bar active and inactive with respect to the handle member, means for actuating the said instrumentalities, said means rendering the said handle member freely rotative when the said instrumentalities are actuated to render the block bar inactive, and means for retaining the handle member in its normal lock bar actuating position when the lock bar is inactive with respect to the handle member, said means being rendered effective when the lock bar is in locking position.

4. A lock mechanism for vehicular doors and the like, comprising, in combination, a lock bar adapted to be mounted on the door in slidable relation therewith for movement into locking and unlocking positions, a handle member for actuating the lock bar, instrumentalities for rendering the lock bar active and inactive with respect to the handle member, means for actuating the said instrumentalities, said means rendering the said handle member freely rotative when the said instrumentalities are actuated to render the lock bar inactive, means normally pressing said lock bar to locking position, and means for retaining the handle member in its normal lock bar actuating position when the lock bar is inactive with respect to the handle member, said means being rendered effective by the pressure on the lock bar when the lock bar is in locking position.

5. A lock mechanism for vehicular doors and the like, comprising, in combination, a lock bar adapted to be mounted on the door in slidable relation therewith for movement into locking and unlocking positions, a handle member for actuating the lock bar, instrumentalities for rendering the lock bar active and inactive with respect to the handle member, means for actuating the said instrumentalities, said means rendering the said handle member freely rotative when the said instrumentalities are actuated to render the lock bar inactive, means normally pressing said lock bar to locking position, and means for retaining the handle member in its normal lock bar actuating position when the lock bar is inactive with respect to the handle member, said means being rendered effective by the pressure on the lock bar when the lock bar is in locking position, and ineffective when the lock bar is moved out of locking position.

6. A door lock mechanism of the character described, comprising, in combination, a lock bar, a handle member, instrumentalities within the handle member for operating the lock bar for unlocking operations, and mechanism for actuating the said instrumentalities from the inside and from the outside of the door, the said inside operating mechanism including a pivotally mounted lever, connections between the lever and the said instrumentalities, and means for actuating the lever, the said inside operating mechanism being adapted to be positioned on the inside of the door to which the lock mechanism is applied and operable under the control of the outside operating mechanism.

7. A door lock mechanism of the character described, comprising, in combination, a plate adapted to be mounted on the door, a lock bar slidably mounted on the plate for movement into unlocking and locking positions, rotative instrumentalities engageable and disengageable with the lock bar for rendering the same active and inactive, respectively, and operating mechanism for operating the said instrumentalities from the inside and from the outside of the door, the said inside mechanism including a button on the said instrumentalities, a connecting member between the button and instrumentalities allowing rotation of the latter relatively to the button, a pivotally mounted lever connected with the button at one end of the lever, and a second button connected to the other end of the lever, whereby, upon operation of the buttons the lever is rocked on its mounting to thereby correspondingly move the said instrumentalities into active and inactive positions, respectively according to the position of the outside mechanism.

THEODORE F. KOENIG.